Oct. 8, 1946.   J. MOTEL   2,409,146
SHUTTER FOR FISHING NETS
Filed July 11, 1945

INVENTOR.
John Motel
BY
Lawler & Lawler
Attorneys.

Patented Oct. 8, 1946

2,409,146

UNITED STATES PATENT OFFICE 2,409,146

SHUTTER FOR FISHING NETS

John Motel, Cleveland, Ohio

Application July 11, 1945, Serial No. 604,435

1 Claim. (Cl. 43—7)

This invention relates to a manually operated shutter for a fishing-net of the seine or trap-net type, and is adapted to release the fish or minnows therefrom when the ends of the net are brought together. The shutter is incorporated in the webbing of the net and is so placed therein that when the ends of the net are brought together the shutter is at the bottom of the net. The shutter in the net may then be placed over a container and manually opened from the inside of the net thus allowing the fish or minnows inclosed in the net to be discharged therethrough into the container.

Fish-nets are divided into two classes:

Gill-nets, in which the fish in attempting to pass through the net is wedged or jammed in a mesh so that it cannot open its gills when it soon drowns or is unable to move forward or backward; and inclosing-nets, by which the fish is surrounded, as the purse-net, the drag-net, the seine, the weir, the casting-net etc. Nets vary in construction from heavy chain oyster-drags to fine linen-thread herring nets, and they are given a variety of names according to their shape, purpose or mode of operation.

Fishing-nets.

The seine, a kind of net used in taking fish; one of the class of encircling nets, consisting of a webbing of network provided with corks or floats at the upper edge and with leads of greater or less weight at the lower, and used to inclose a certain area of water, and by bringing the ends together, either in a boat or on the shore, to secure the fish that may be inclosed.

Seines vary in size from one small enough to take a few minnows to the shad-seine of a mile or more in length, handled by a windlass worked by horses or by steam engine.

Drag-seine, a haul ashore seine, draw-seine, a seine which may be pursed or drawn into the shape of a bag.

For the purpose of aiding in the explanation of the invention I show in the accompanying drawing and hereinafter describe one practical embodiment of it. It is to be understood, however, that this embodiment is presented merely by way of illustration and that the specific showing and description of it are not to be construed in any fashion as limiting the appended claim short of the true and comprehensive scope of the invention in the art. There are of course numerous methods of performing the mechanical features of which I have shown but one.

Referring to the drawing in which numerals of like character designate similar parts throughout the several views.

Figures 1, 2, 3:
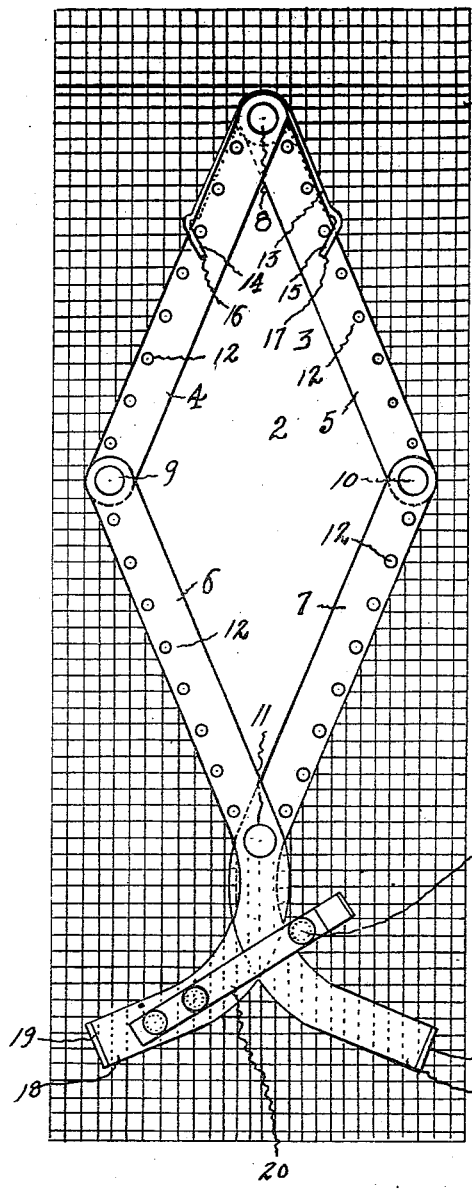
Figure 1 is a plan view showing the shutter incorporated in a fishing-net in open position.
Figure 2 is a plan view of the shutter removed from the fishing-net and showing the same in closed position.
Figure 3 is an end view of Figure 2.

In the fishing-net 1, shown fragmentary, there is provided an opening 2 having secured therein a shutter 3 adapted to release fish or minnows inclosed in the fishing-net.

The shutter comprises a series of articulated links 4, 5, 6 and 7, held in assembled relationship by means of rivets 8, 9, 10 and 11. The links 4 and 5 are of equal length, and each link is provided with a series of spaced holes 12 adjacent their outer edge for the reception of thread by means of which the links of the shutter may be secured in place in the opening in the webbing of the fishing-net.

Around the rivet 8 and interposed between the links 4 and 5 there is mounted a torsion spring 13, the ends 14 and 15 are hooked over the outer edge of the links 4 and 5 adjacent the rivet 8, as at 16 and 17 and are adapted to assist in holding the shutter in closed position.

The links 6 and 7 are also provided with a series of spaced holes 12 adjacent their outer edge and serve the same purpose as those described in connection with the links 4 and 5. The links 6 and 7 are provided with integrally formed laterally extending portions 18, the ends of which are bent upwardly as at 19 to provide a means for the fingers to grasp in opening and closing the shutter.

On the link 6 there is provided a flat spring member 20 riveted or otherwise secured thereto having a fixed pin 21 fast therein and extending downwardly therefrom and adapted to hold the shutter in open position, when it is in the position shown in Figure 1, and in closed position when it is in the position shown in Figure 2. The end 22 of the spring is inclined upward as at 23, shown in Figure 3 to provide a means to manually lift the spring with its fixed pin to permit the shutter to be opened or closed.

It is believed that the operation of the shutter will be clear from the foregoing description, and it will be apparent that the construction shown provides a compact and economical apparatus that may be incorporated in the fishing-net with a minimum amount of labor.

What I claim as my invention and desire to secure by Letters Patent of the United States is:

In or for a fishing-net, a shutter apparatus comprising the combination of a plurality of articulated links normally held in closed position, manually operated means having a normally inactive position connected to and movable with one of the aforesaid articulated links and adapted to release the links, when manually manipulated, to produce an opening in the fishing-net, and means cooperating with the links to hold the links in closed position when the manually operated inactive means is returned to its initial position.

JOHN MOTEL.